United States Patent [19] [11] 4,050,947
Ahlgren et al. [45] Sept. 27, 1977

[54] PROCESS FOR OPALIZING GLASS

[75] Inventors: Raymond E. Ahlgren; Danial W. Schwoerer; Boyce H. Lundstrom, all of Portland, Oreg.

[73] Assignee: Bullseye Glass Co., Portland, Oreg.

[21] Appl. No.: 667,494

[22] Filed: Mar. 17, 1976

[51] Int. Cl.² .................... C03C 3/04; C03C 3/08
[52] U.S. Cl. .............................. 106/52; 106/54; 106/DIG. 8
[58] Field of Search .............. 106/52, DIG. 8, 54

[56] References Cited

U.S. PATENT DOCUMENTS

| | | | |
|---|---|---|---|
| 3,622,359 | 11/1971 | Pither et al. | 106/52 |
| 3,661,601 | 5/1972 | Dumbaugh et al. | 106/54 |
| 3,681,098 | 8/1972 | Dumbaugh et al. | 106/52 |
| 3,716,385 | 2/1973 | Ritze | 106/47 Q |
| 3,849,097 | 11/1974 | Giffen et al. | 106/52 |

Primary Examiner—Patrick P. Garvin
Assistant Examiner—Mark Bell
Attorney, Agent, or Firm—Klarquist, Sparkman, Campbell, Leigh, Hall and Whinston

[57] ABSTRACT

This invention relates to the use of $AlF_3$ as an opacifying agent in an opal glass making batch which contains 40 wt. percent or more of container and sheet glass cullett. The batch consists essentially, in weight percent, of 40–85% cullett, 0–25% $Na_2B_4O_7.5H_2O$, 0–12% $CaMg(CO_3)_2$, 3–19% $SiO_2$, and an amount of $AlF_3$, which is 10–30% of the weight of the cullett.

6 Claims, No Drawings

PROCESS FOR OPALIZING GLASS

BACKGROUND OF THE INVENTION

Opal glasses are well known and have been produced for many years. Such glasses are widely used in decorative consumer products such as "Tiffany" windows, jewelry, and blown glass ornaments and utensils. The opacity of opal glass is the result of a glass structure which includes two phases of different refractive indexes. In most cases a light diffusing phase is dispersed throughout a transparent glassy phase. Glass compositions which form a second, light diffusing phase automatically upon cooling from a molten state are known as spontaneously opacifiable glasses. Due to the relative simplicity of producing spontaneously opacifiable glasses, they are preferred to opal glasses which require a subsequent heat treatment to produce the light diffusing phase.

Cullett from recycled glass such as container glass or window glass is becoming an increasing popular and available raw material for the production of glass products. Container glass cullett, however, is approximately 13% alkali metal oxide in the form of $Na_2O$ and 12% alkaline earth oxide in the form of CaO. These oxide levels are very near to the acceptable limit for alkali metal oxides and alkaline earth oxides in opalized glass. Attempts to add conventional opacifying agents, such as cryolite ($Na_3AlF_6$) or fluorspar ($CaF_2$), to form opal glass from cullett have failed because these opalizing agents contain substantial amounts of either calcium or sodium. Thus, a glass making batch which contains both an effective amount of a single traditional opacifying agent and a high percentage of cullett produces a glass composition which contains excessive amounts of sodium oxide or calcium oxide. Mixtures of cryolite and fluorspar are not suitable because they form an immiscible phase which excessively stratifies in the melting process.

Previously, to form opal glass of suitable quality from cullett it has been necessary to add large amounts of silicon dioxide and other basic glass making ingredients so as to reduce the calcium and sodium content of the batch. Adding large amounts of raw materials, however, greatly reduces the advantages of using recycled glass.

SUMMARY OF THE INVENTION

It has now been discovered that an excellent opal glass may be produced directly from cullett with relatively small additions of silicon dioxide ($SiO_2$) when $AlF_3$ is used as an opacifying agent.

The primary object of this invention is to provide a means of producing high quality spontaneous opal glass from a glass making batch which contains a large percentage of cullett.

DESCRIPTION OF THE PREFERRED EMBODIMENT

For purposes of illustration the invention will be described utilizing a cullett having the following approximate composition:

|  | Weight Percent |
|---|---|
| $SiO_2$ | 72 |
| $Na_2O$ | 13 |
| CaO | 12 |
| Al+Fe oxides | 3 |

This composition is very near the average composition of cullett from container glass. Culletts from window glass are of a similar composition and can be substituted for container glass cullett. The present invention is specifically directed to the making of opal glass from batches which contain at least 40% by weight cullett. In batches containing lesser amounts of cullett sodium and calcium oxide concentrations are sufficiently diluted by the addition of fresh glass making ingredients that conventional means of opacifying glass may be used. A suitable batch for the present process could contain as much as 85% cullett by weight. Preferable batches contain between 50 and 75% cullett.

A flux such as boron oxide ($B_2O_3$) in the final glass composition is desirable to reduce the melting temperature of the glass. When boron is added to a glass making batch in the form of five mole borax ($Na_2B_4O_7.5H_2$), the batch may contain up to 25% borax. The best glass is achieved when the initial batch contains between 15 and 22% borax. As previously mentioned, borax contributes sodium to the batch. Large amounts of borax in the batch can cause the glass composition to exceed the maximum allowable sodium oxide. Other fluxes such as, for example, soda ash, potassium nitrate and potassium carbonate could also be used.

As is well known, sodium silicate glass is water soluble and therefore avoided in glass compositions which may come into contact with water. The formation of sodium silicate glass is avoided if sufficient amounts of calcium oxide are present in the glass composition. Cullett used as a raw material in the present process contains sodium oxide and calcium oxide in such a ratio that water solubility is not a great problem. The presence of other sodium-containing compounds in the batch, e.g. sodium introduced with borax, may necessitate the addition of a source of calcium to the batch to restore the proper sodium oxide/calcium oxide ratio. Dolomite ($CaMg(CO_3)_2$) is a most convenient and suitable source of calcium. If dolomite is added, it may constitute up to 12% of the batch ingredients depending upon the amount of excess sodium which needs to be balanced. In a glass making batch with a preferred amount of borax, proper balance is maintained if the batch contains 1 to 4% dolomite. The magnesium in dolomite is converted to MgO when the dolomite is oxidized. MgO is basically the equivalent of CaO in glass compositions although some differences in the physical characteristics of glass are observed when MgO is present.

It is necessary to include some additional $SiO_2$ in each glass making batch in order to increase the physical strength of the glass composition. $SiO_2$ may be added in amounts of from 3 to 19% of the batch ingredients, preferably 6 to 13%. If the amount of $SiO_2$ added to a batch exceeds about 19%, a significant increase in melting temperature results.

Aluminum fluoride ($AlF_3$) is the opalizing agent used in this composition. Although either anhydrous or hydrous $AlF_3$ may be added to the glass making batch, for the purpose of computing the weight percent figures in this specification, it is assumed that anhydrous $AlF_3$ is used. The weight of $AlF_3$ in the batch should be 10 to 30% of the weight of the cullett in the batch.

Glass is prepared from the aforementioned ingredients by first crushing the cullett glass to a convenient size (−100 mesh U.S. Sieve to one inch) for mixing with the other ingredients. Next the cullet is mixed with the other ingredients to complete the batch for forming opal glass. The batch is loaded into a heated conventional glass melting unit, e.g. a natural gas-fired furnace. After the entire batch has melted, the melt temperature is reduced to a point where the molten glass can be cast. If the glass is to be cast as a sheet, it may be poured onto a metal plate and rolled to a desired thickness. Other well known glass casting procedures may be used to form other articles. If during the casting process the molten glass cools too rapidly, the cast glass will warp. Sheet glass which is warped may be flattened by reheating the glass to a temperature sufficient to allow plastic deformation. Next the glass is cooled in a lehr at a controlled rate through a series of temperature zones.

EXAMPLE

The following is an example of the preparation of an opal glass from a batch of the following compositions:

|  | Pounds | Wt. Percent |
|---|---|---|
| Cullett | 192 | 59 |
| Borax | 60 | 19 |
| Dolomite | 7 | 2 |
| SiO$_2$ | 30 | 9 |
| AlF$_3$ | 36 | 11 |
| Total | 325 | 100 |

This batch was melted in a furnace at a temperature of about 2400° F (1320° C). After all the ingredients were melted, the temperature was reduced to between 2080°–2100° F (1140°–1150° C). The casting temperature of this composition is within the range of 2200°–2400° F (1200°–1320° C). The molten mixture was poured onto a metal sheet and rolled to a thickness of ¼-inch. Thereafter it was cooled at a controlled rate in a lehr which consists of a furnace with several zones of different temperatures. The first zone of the lehr was maintained at about 1360° F (740° C), a temperature sufficient to soften the glass. Under these conditions gravity acting on the softened glass was sufficient to relieve the warp acquired by the glass sheet during the casting process. Temperatures in the next two zones of the lehr were 1020° F (550° C) and 870° F (470° C) respectively. The temperatures in these zones were within the annealing range for the glass. The subsequent zones of the lehr were maintained at 600° F (320° C), 350° F (180° C), and 150° F (70° C). When the glass sheets, which were able to withstand thermal shock at temperatures below 350° F (180° C) were removed from the last zone of the lehr, they were at a temperature of about 300° F (150° C). The sheets were allowed to further cool at room temperature. The glass passed entirely through the lehr in a period of about 25 minutes. As the glass cooled the light diffusing phase formed spontaneously.

The glass produced was approximately of the following composition:

| SiO$_2$ | 53.7% |
|---|---|
| Na$_2$O | 13.2% |
| CaO+MgO | 8.6% |
| B$_2$O$_3$ | 9.2% |
| Al$_2$O$_3$ | 7.6% |
| F | 7.8% |

The opal glass formed from the cullett-containing batches of the present invention does not differ substantially in composition from other well known and widely used opal glasses. It is of the "common opal" type and is a suitable glass for blowing or casting into sheets and jewels.

Opal glass made from clear container glass cullett is white in color. Coloring oxides may be added to the composition to produce opal glasses of any desired color. If colored cullett is used in the batch, opal glass of a similar color will be obtained, e.g. brown cullett in the batch produces an amber colored opal glass.

The degree of opacity displayed by a glass depends upon the amount of the AlF$_3$ included in the batch. As a general rule the lower the melt temperature the greater the opacity of the glass. However, temperature and time at melt have to be sufficient to completely melt and fine the composition, as will be understood by those skilled in the art. Opacity may thus be varied from nearly clear to nearly opaque by an appropriate choice of melt temperature, time at temperature and AlF$_3$ content.

While we have shown and described a preferred embodiment of our invention, it will be apparent to those skilled in the art that changes and modifications may be made without departing from our invention in its broader aspects.

We claim:

1. A glass making batch for the production of a spontaneous opal glass containing essentially, in weight percent, of:
   40–85% of a cullett which, in weight percent, contains about 72% SiO$_2$, 13% Na$_2$O, 12% CaO, and 3% metal oxide selected from the group consisting of aluminum oxides, iron oxides and mixtures thereof;
   3–19% SiO$_2$; and
   an amount of AlF$_3$ which is 10–30% of the weight of the cullett.

2. The batch of claim 1 which also contains 0–25% Na$_2$B$_4$O$_7$.5H$_2$O and 0–12% CaMg(CO$_3$)$_2$.

3. The batch of claim 2 which contains, in weight percent, about 50–75% of said cullett, 15–22% Na$_2$B$_4$O$_7$.5H$_2$O, 1–4% CaMg(CO$_3$)$_2$, and 6–13% SiO$_2$.

4. The batch of claim 3 which contains, in weight percent, 59% of said cullett, 19% Na$_2$B$_4$O$_7$.5H$_2$O, 2% CaMg(CO$_3$)$_2$, 9% SiO$_2$ and 11% AlF$_3$.

5. The batch as set forth in claim 1 which also contains a flux selected from the class consisting of borax, soda ash, potassium nitrate and potassium carbonate.

6. A glass making batch for the production of a spontaneous opal glass consisting essentially, in weight percent, of:
   40–85% of a cullet which, in weight percent, contains about 72% SiO$_2$, 13% Na$_2$O, 12% CaO, and 3% metal oxide selected from the group consisting of aluminum oxides, iron oxides and mixtures thereof;
   3–19% SiO$_2$; and
   an amount of AlF$_3$ sufficient to induce spontaneous opalization of the glass formed from said batch.

* * * * *

UNITED STATES PATENT AND TRADEMARK OFFICE
CERTIFICATE OF CORRECTION

PATENT NO. : 4,050,947
DATED : September 27, 1977
INVENTOR(S) : Raymond E. Ahlgren et al It is certified that error appears in the above-identified patent and that said Letters Patent are hereby corrected as shown below:

Column 2, line 21, "$(Na_2B_4O_7 \cdot 5H_2)$" should be --$(Na_2B_4O_7 \cdot 5H_2O)$--

Column 2, line 42, "propersodium" should be --proper sodium--

Column 4, claim 1, line 36, "containing" should be --consisting--.

Signed and Sealed this

Third Day of January 1978

[SEAL]

Attest:

RUTH C. MASON
Attesting Officer

LUTRELLE F. PARKER
Acting Commissioner of Patents and Trademarks